United States Patent
Aslaksen et al.

(10) Patent No.: US 11,528,261 B2
(45) Date of Patent: Dec. 13, 2022

(54) DYNAMIC UNAUTHORIZED ACTIVITY DETECTION AND CONTROL SYSTEM

(71) Applicant: Bank of America Corporation, Charlotte, NC (US)

(72) Inventors: Geoffrey George Aslaksen, Matthews, NC (US); John H. Denning, Charlotte, NC (US); Ruchira Ghosh, Southlake, TX (US); Russell Scott Nejdl, Jr., Carrollton, TX (US)

(73) Assignee: Bank of America Corporation, Charlotte, NC (US)

( * ) Notice: Subject to any disclaimer, the term of this patent is extended or adjusted under 35 U.S.C. 154(b) by 151 days.

(21) Appl. No.: 16/860,341

(22) Filed: Apr. 28, 2020

(65) Prior Publication Data

US 2021/0336940 A1 Oct. 28, 2021

(51) Int. Cl.
 *H04L 9/40* (2022.01)
 *G06N 20/00* (2019.01)
(52) U.S. Cl.
 CPC ............. *H04L 63/08* (2013.01); *G06N 20/00* (2019.01); *H04L 63/1416* (2013.01); *H04L 63/1441* (2013.01)
(58) Field of Classification Search
 CPC .... G06Q 10/067; G06Q 50/265; G06Q 20/40; G06Q 40/02; G06Q 20/4016; G06Q 30/0185; G06Q 10/10; G06Q 30/0225; G06N 5/02; G06N 7/005; G06N 20/00; H04L 63/08; H04L 63/1441; H04L 63/1416
 USPC .......................................................... 726/6
 See application file for complete search history.

(56) References Cited

U.S. PATENT DOCUMENTS

| | | | |
|---|---|---|---|
| 7,870,078 B2 | 1/2011 | Clark et al. | |
| 8,352,281 B2 | 1/2013 | Clark et al. | |
| 3,606,712 A1 | 12/2013 | Choudhuri et al. | |
| 8,880,435 B1 * | 11/2014 | Catlett | H04L 63/1491 705/75 |
| 9,286,637 B1 | 3/2016 | Keld et al. | |

(Continued)

OTHER PUBLICATIONS

Use of the Dempster—Shafer theory to detect account takeovers in mobile money transfer services Luigi Coppolino • Salvatore D'Antonio • Valerio Formicola • Carmine Massei • Luigi Romano Springer-Verlag Berlin Heidelberg (Year: 2015).*

*Primary Examiner* — Benjamin A Kaplan
(74) *Attorney, Agent, or Firm* — Banner & Witcoff, Ltd.

(57) ABSTRACT

Systems for dynamically detecting and controlling unauthorized events are presented. In some examples, data may be received from one or more computing systems. In some examples, the computing systems may each be associated with an enterprise unit within an enterprise organization. The data may include, in some examples, processed unauthorized activity event data, such as account takeover event data. The data received may be aggregated and analyzed (e.g., using machine learning) to identify potential threats and threat outputs. In some examples, the threat output may include a user interface indicating the threat or potential threat, systems or applications potentially impacted, enterprise units impacted, and the like. Based on the threat output, one or more mitigation actions may be identified and executed. The mitigation actions may include modifying operation of one or more systems, modifying authentication requirements, and the like.

19 Claims, 11 Drawing Sheets

(56) References Cited

U.S. PATENT DOCUMENTS

| | | | |
|---|---|---|---|
| 9,633,322 B1* | 4/2017 | Burger | G06Q 20/405 |
| 10,102,570 B1 | 10/2018 | Kapczynski et al. | |
| 10,373,140 B1* | 8/2019 | Chang | G06Q 20/14 |
| 10,410,220 B2 | 9/2019 | Miltonberger | |
| 11,122,064 B2* | 9/2021 | Manadhata | H04L 63/1441 |
| 2015/0039757 A1* | 2/2015 | Petersen | H04L 63/0227 |
| | | | 709/224 |
| 2017/0251013 A1* | 8/2017 | Kirti | H04L 63/1408 |
| 2018/0033009 A1 | 2/2018 | Goldman et al. | |
| 2018/0033089 A1 | 2/2018 | Goldman et al. | |

\* cited by examiner

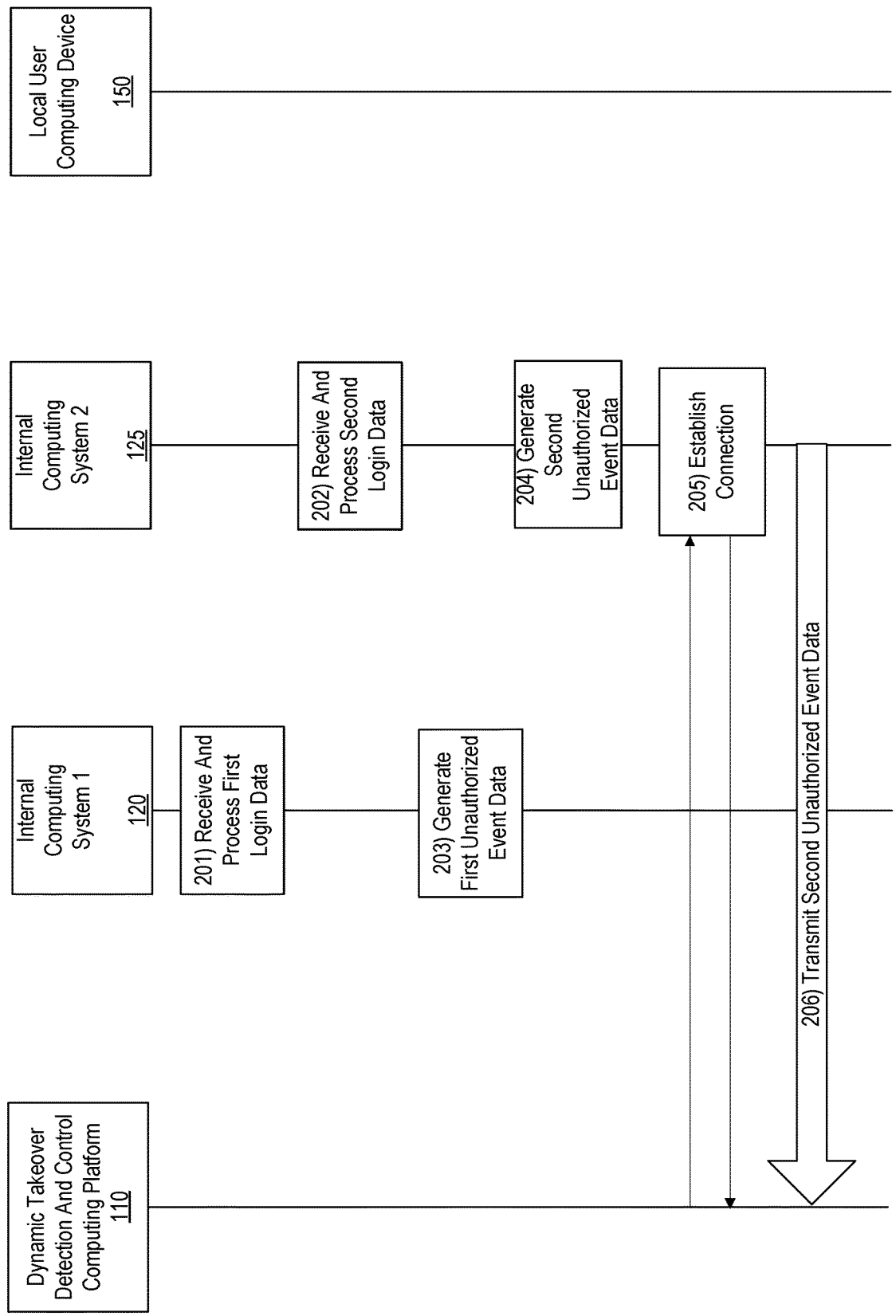

DYNAMIC UNAUTHORIZED ACTIVITY DETECTION AND CONTROL SYSTEM

BACKGROUND

Aspects of the disclosure relate to electrical computers, systems, and devices for dynamic unauthorized event detection and processing functions.

Large scale enterprises often host various customer facing systems and applications. Unauthorized users often use credential harvesting to gain access to systems, applications, data, and the like. Credential harvesting may include using compromised credentials, such as those obtained from unauthorized sources, to attempt unauthorized access to systems, applications and/or data. In many examples, unauthorized users may attempt an initial login to determine whether credentials are valid. If so, the credentials may be used to access systems, accounts, data, and the like, without user authorization, may be sold to other unauthorized actors, or the like.

In order to combat this unauthorized activity, systems may monitor authentication portals to detect attempts to takeover an account or otherwise access data without authorization. These processes may result in mitigation actions being executed at an account level, such as requesting additional authentication information, locking an account, or the like. However, it would be advantageous to capture and analyze data associated with unauthorized activity from multiple enterprise units to detect and control enterprise-wide vulnerabilities.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with detecting and controlling response to unauthorized events.

In some examples, data may be received from one or more computing systems. In some examples, the computing systems may each be associated with an enterprise unit within an enterprise organization. The data may include, in some examples, processed unauthorized activity event data, such as account takeover event data. The data received may be aggregated and analyzed (e.g., using machine learning) to identify potential threats and threat outputs. In some examples, the threat output may include a user interface indicating the threat or potential threat, systems or applications potentially impacted, enterprise units impacted, and the like.

Based on the threat output, one or more mitigation actions may be identified and executed. The mitigation actions may include modifying operation of one or more systems, modifying authentication requirements, and the like. After executing the one or more mitigation actions, mitigation data may be captured and used to update and/or validate one or more machine learning datasets.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2E depict an illustrative event sequence for implementing dynamic takeover detection and control functions in accordance with one or more aspects described herein;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, large enterprise organizations often support or host one or more client-facing systems, applications, or the like. In order to access the systems, applications, or the like, a user must provide valid credentials to authenticate the user. Unauthorized actors often use credential harvesting to obtain valid credentials or attempt to "guess" valid credentials (e.g., username and/or username and password pair) in order to gain unauthorized access to the systems, applications and/or data accessible via the systems or applications. Often, unauthorized actors will attempt to test login credentials (e.g., credentials obtained without authorization or via unauthorized activity) in order to determine whether they are valid. This process may be considered an unauthorized activity event or an account takeover (e.g., an unauthorized user is attempting to access an account of a user with credentials obtained via unauthorized activity). If the credentials are valid, the unauthorized actors may sell the credentials or may use the credentials for further unauthorized activity. Accordingly, identifying these unauthorized actors during the test login may be important to thwart unauthorized activity and/or mitigate an impact of unauthorized activity.

Accordingly, systems within the enterprise organization and/or implemented by one or more enterprise units of the enterprise organization may monitor login attempts at the authentication portals in order to detect the account takeover attempt or unauthorized activity. Data associated with the unauthorized activity or account takeover attempts may be captured and further analyzed to detect larger scale vulnerabilities. For instance, unauthorized activity event data or account takeover data from an enterprise unit may be aggregated with unauthorized activity event data or account takeover data from one or more other enterprise units to generate aggregated data. The aggregated data may be further analyzed to identify vulnerabilities at an enterprise organization level, between two or more enterprise units, and the like.

These and various other arrangements will be discussed more fully below.

Figure 1A:
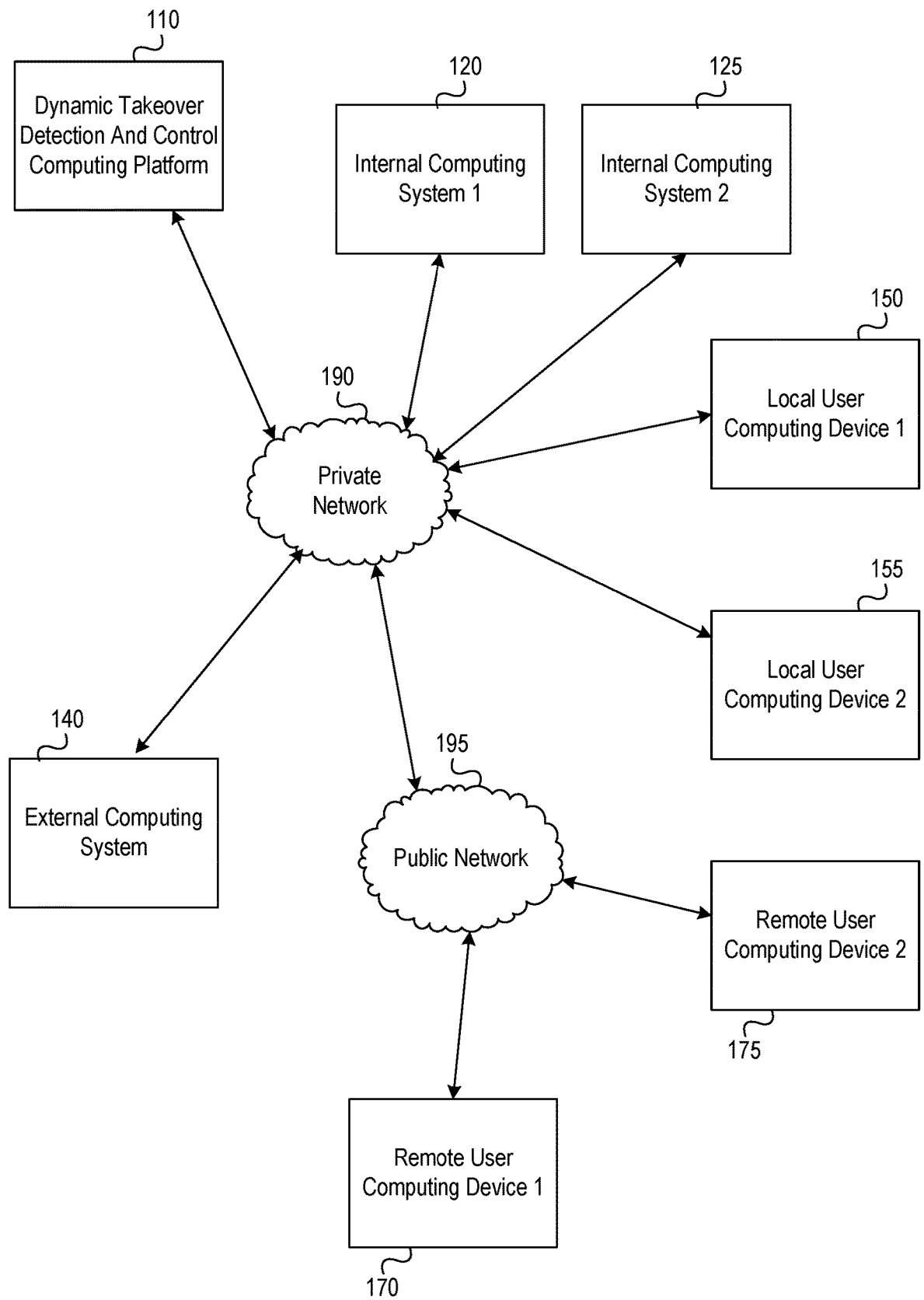
FIGS. 1A and 1B depict an illustrative computing environment for implementing dynamic takeover detection and control functions in accordance with one or more aspects described herein.
Figure 1B:
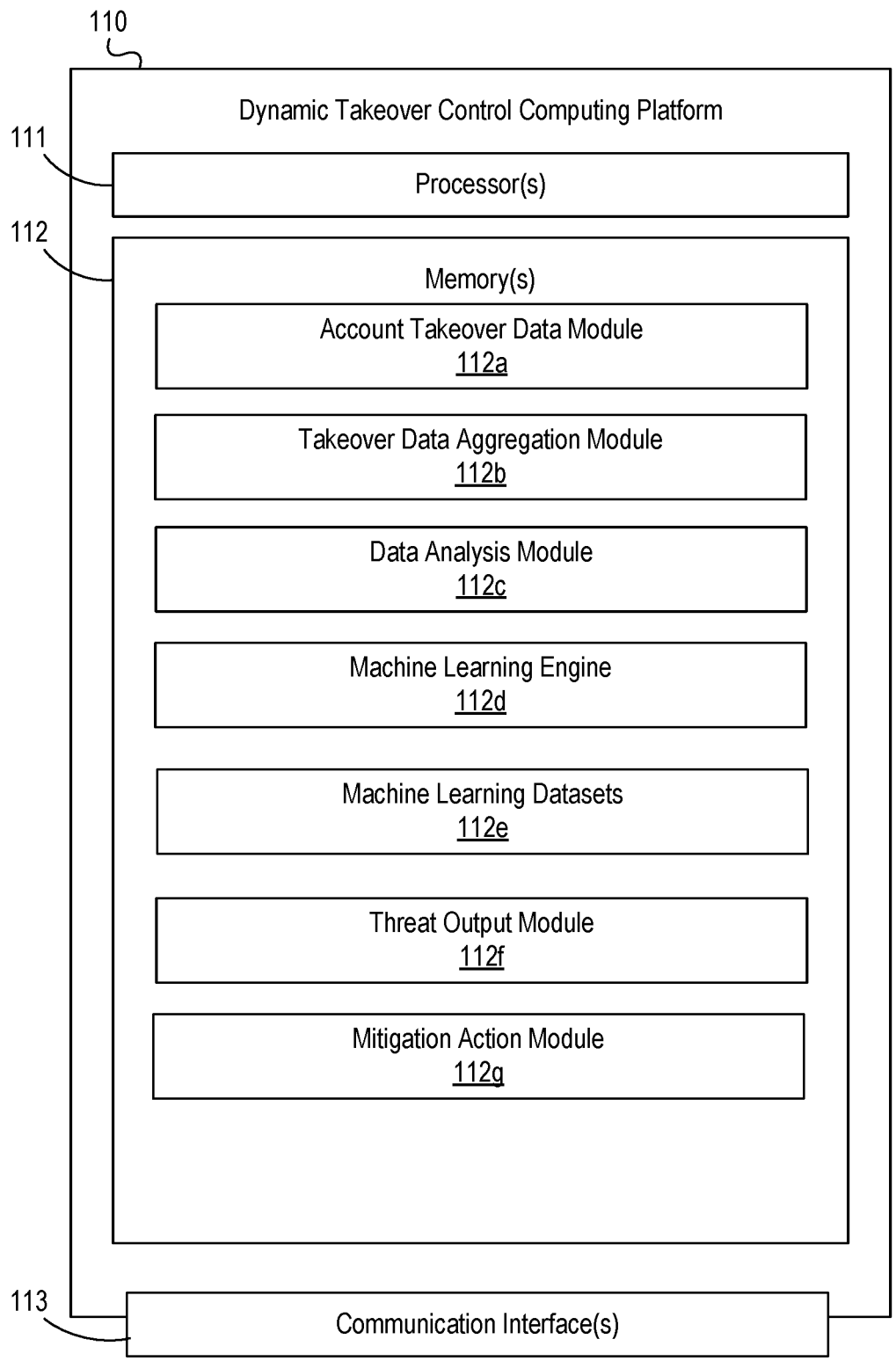

FIGS. 1A-1B depict an illustrative computing environment for implementing dynamic takeover detection and control functions in accordance with one or more aspects described herein. Referring to FIG. 1A, computing environment 100 may include one or more computing devices and/or other computing systems. For example, computing environment 100 may include dynamic takeover detection and control computing platform 110, internal computing system 1 120, internal computing system 2 125, external computing system 140, a first local user computing device 150, a second local user computing device 155, a first remote user computing device 170, and a second remote user computing device 175. Although two internal computing systems 120, 125 are shown, more or fewer entity computing devices may be used without departing from the invention.

Dynamic takeover detection and control computing platform 110 may be configured to provide intelligent, dynamic, unauthorized activity (e.g., account takeover) detection and control functions. Dynamic takeover detection and control computing platform 110 may be a computer system that includes one or more computing devices (e.g., servers, server blades, or the like) and/or other computer components (e.g., processors, memories, communication interfaces) that may be used to implement machine learning algorithms, or the like to recognize patterns and generate or identify threats posed due to account takeover attempts or other unauthorized activity events, generate or identify one or more mitigating actions, and the like.

In some instances, the dynamic takeover detection and control computing platform 110 may be maintained by an enterprise organization (e.g., a financial institution, or the like) and may receive data from one or more sources, such as internal computing device 1 120, internal computing device 2 125, external computing system 140, local user computing device 150, local user computing device 155, remote user computing device 170, remote user computing device 175, and the like. Dynamic takeover detection and control computing platform 110 may analyze the data using, for instance, machine learning techniques, evaluate and analyze account takeover attempts or other unauthorized activity events, evaluate attempted account takeovers to determine a threat associated with the takeover or takeover attempts, quantify data associated with the takeover or takeover attempts, identify mitigating actions, and the like.

For instance, data associated with one or more account takeover attempts or other unauthorized activity events may be received. In some examples, account takeover attempts may include an unauthorized user attempting to login to an account by inputting one or more usernames, username and password combinations, and the like, to attempt to identify valid login credentials. In another example, an account takeover attempt may include an unauthorized user logging in to an account using an authentic username and/or password combination that was obtained without the authorized user's authorization (e.g., via data breach, purchase from an unauthorized user, or the like). In some examples, dynamic takeover detection and control computing platform 110 and/or other devices or systems associated therewith (e.g., internal computing system 1 120, internal computing system 2 125, and the like) may evaluate and analyze the login and/or other data to identify potential account takeover occurrences and/or attempts. Identified account takeovers and/or account takeover attempts may be further analyzed to identify and/or execute one or more mitigating actions (e.g., lock an account, deny a requested service, or the like) in order to protect the user associated with the account.

In some examples, the enterprise implementing the dynamic takeover detection and control computing platform 110 may include a plurality of different enterprise units that each monitor and evaluate account takeover and takeover attempts, and/or other data associated with unauthorized access to accounts, systems, applications, and the like. The dynamic takeover detection and control computing platform 110 may receive data from a plurality of enterprise units, aggregate the data (e.g., including formatting data for aggregation and analysis), and analyze the data at an enterprise level to identify vulnerabilities, broad mitigating actions, and the like. In some examples, machine learning may be used to evaluate the data.

Internal computing system 1 120 and internal computing system 2 125 may be various systems internal to the enterprise that may host or execute systems to which a user may attempt to login (e.g., an online banking application, a mobile banking application, or the like). In some examples, internal computing system 1 120 and/or internal computing system 2 125 may include systems, applications, and the like, to evaluate login attempts to detect potential account takeovers. For instance, internal computing system 1 120 and/or internal computing system 2 125 may evaluate login attempts to detect an increase in invalid usernames being used. In another example, internal computing system 1 120 and/or internal computing system 2 125 may evaluate login attempts compared to known habits of a user (e.g., compare device from which the login attempt is received to known devices associated with the user, compare login times and locations to current login data, and the like) to detect an attempted account takeover. In some examples, logs associated with attempted logins may be continuously received, e.g., in real-time or near real-time, to detect potential account takeover attempts and execute mitigating actions. Additionally or alternatively, logs may be analyzed at predetermined time intervals (e.g., every 5 minutes, every 10 minutes, or the like) to evaluate and mitigate impact of any potential unauthorized activity.

Local user computing device 1 150 and local user computing device 2 155 may be enterprise computing devices in communication with one or more other computing devices or systems. For instance, local user computing device 1 150 and/or local user computing device 2 155 may be computing devices configured to communicate with dynamic takeover determination and control computing platform 110 to receive and display one or more identified vulnerabilities, execute one or more mitigating actions, receive and display data quantifying an impact of analyzed account takeover data, and the like. Additionally or alternatively, local user computing device 1 150 and/or local user computing device 2 155 may be configured to view and/or further analyze data logs, account takeover data, and the like, and/or control parameters associated with dynamic takeover detection and control computing platform 110.

Remote user computing device 1 170 and remote user computing device 2 175 may be computing devices associated with a user outside of the enterprise and may, in some examples, be user computing devices (e.g., desktop computers, laptop computers, tablet computers, smartphones, and the like) that may be used to request access to an application or system, receive user login credentials, and the like. Remote user computing device 1 170 and/or remote user computing device 2 175 may be associated with authorized users of an account (e.g., legitimate login attempts) and/or unauthorized users (e.g., account takeover attempts).

Although two internal computing systems, local user computing devices and remote user computing devices are shown, more or fewer devices or systems may be used without departing from the invention.

External computing system 140 may be a computing device or system external to the enterprise that may provide data (e.g., publicly available or other data captured outside the enterprise) that may be used to analyze incoming data to detect and control account takeover attempts. For instance, external computing system 140 may provide data associated with current unauthorized activity (e.g., known scams, unauthorized actors, or the like) that may be used to analyze the account data, update and/or validate one or more machine learning datasets, or the like.

Computing environment 100 also may include one or more computing platforms. For example, and as noted above, computing environment 100 may include dynamic takeover detection and control computing platform 110. As illustrated in greater detail below, dynamic takeover detection and control computing platform 110 may include one or more computing devices configured to perform one or more of the functions described herein. For example, dynamic takeover detection and control computing platform 110 may include one or more computers (e.g., laptop computers, desktop computers, servers, server blades, or the like).

As mentioned above, computing environment 100 also may include one or more networks, which may interconnect one or more of dynamic takeover detection and control computing platform 110, internal computing system 1 120, internal computing system 2 125, external computing system 140, local user computing device 150, local user computing device 155, remote user computing device 170, and/or remote user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization or enterprise (e.g., a corporation, financial institution, educational institution, governmental institution, or the like) and may interconnect one or more computing devices associated with the organization. For example, dynamic takeover detection and control computing platform 110, internal computing system 1 120, internal computing system 2 125, local user computing device 150, and local user computing device 155, may be associated with an organization or enterprise (e.g., a financial institution), and private network 190 may be associated with and/or operated by the organization, and may include one or more networks (e.g., LANs, WANs, virtual private networks (VPNs), or the like) that interconnect dynamic takeover detection and control computing platform 110, internal computing system 1 120, internal computing system 2 125, local user computing device 150, local user computing device 155, and one or more other computing devices and/or computer systems that are used by, operated by, and/or otherwise associated with the organization or enterprise. Public network 195 may connect private network 190 and/or one or more computing devices connected thereto (e.g., dynamic takeover detection and control computing platform 110, internal computing system 1 120, internal computing system 2 125, local user computing device 150, local user computing device 155) with one or more networks and/or computing devices that are not associated with the organization. For example, external computing system 140, remote user computing device 170, remote user computing device 175, might not be associated with an organization or enterprise that operates private network 190 (e.g., because external computing system 140, remote user computing device 170, and/or remote user computing device 175, may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the Internet) that connect external computing system 140, remote user computing device 170, and/or remote user computing device 175, to private network 190 and/or one or more computing devices connected thereto (e.g., dynamic takeover detection and control computing platform 110, internal computing system 1 120, internal computing system 2 125, local user computing device 150, local user computing device 155). In some examples, dynamic takeover detection and control computing platform 110 may communicate with external computing system 140, remote user computing device 170, 175 (e.g., via public network 195) to receive external data, receive login attempts for evaluation, and the like.

Referring to FIG. 1B, dynamic takeover detection and control computing platform 110 may include one or more processors 111, memory 112, and communication interface 113. A data bus may interconnect processor(s) 111, memory 112, and communication interface 113. Communication interface 113 may be a network interface configured to support communication between dynamic takeover detection and control computing platform 110 and one or more networks (e.g., private network 190, public network 195, or the like). Memory 112 may include one or more program modules having instructions that when executed by processor(s) 111 cause dynamic takeover detection and control computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of dynamic takeover detection and control computing platform 110 and/or by different computing devices that may form and/or otherwise make up dynamic takeover detection and control computing platform 110.

For example, memory 112 may have, store and/or include account takeover data module 112a. Account takeover data module 112a may store instructions and/or data that may cause or enable the dynamic takeover detection and control computing platform 110 to receive and analyze login attempts to detect account takeover attempts or other unauthorized activity events. Analyzing the data may be performed at another computing device (e.g., internal computing system 1 120, internal computing system 2 125, or the like) and outputs of the analysis may be transmitted to the account takeover data module 112a of the dynamic takeover detection and control computing platform 110. The account takeover data may be received from a plurality of computing devices or systems and may be received from one or more enterprise units within the enterprise organization implementing the dynamic takeover detection and control computing platform 110. The account takeover data may include data identifying account takeover attempts, credentials used, sources identified, mitigating actions taken, outcome of mitigating actions, and the like.

Dynamic takeover detection and control computing platform 110 may further have, store and/or include takeover data aggregation module 112b. Takeover data aggregation module 112b may store instructions and/or data that may cause or enable the dynamic takeover detection and control computing platform to aggregate data received from one or more enterprise units. For instance, data that is received and analyze by the account takeover data module 112a or analyzed data received by the account takeover data module 112a may be aggregated for further analysis. In some examples, aggregating the data may include formatting data for further processing and analysis.

Dynamic takeover detection and control computing platform 110 may further have, store and/or include data analysis module 112c. Data analysis module 112c may store instructions and/or data that may cause or enable dynamic takeover detection and control computing platform 110 to analyze the aggregated data to identify vulnerabilities, quantify an impact of account takeover measures for one or more enterprise units or mitigating actions taken in response to an account takeover or account takeover attempt, and the like. In some examples, machine learning may be used to analyze the data. For instance, data associated with login attempts, account takeovers and/or account takeover attempts may be analyzed using, for example, machine learning to identify patterns or trends in the data, identify a threat or potential threat associated with the data, identify one or more mitigating actions to execute, and the like.

Accordingly, dynamic takeover detection and control computing platform 110 may have, store and/or include a machine learning engine 112d and machine learning datasets 112e. Machine learning engine 112d and machine learning datasets 112e may store instructions and/or data that may cause or enable dynamic takeover detection and control computing platform 110 to analyze data to identify patterns or sequences within account takeover or login data to identify attempted account takeovers, actual account takeovers or other unauthorized activity events, identify enterprise-wide vulnerabilities, identify a threat or potential threat associated with the data or vulnerabilities, identify mitigating actions to execute to mitigate an impact of the threat, and the like. The machine learning datasets 112e may be generated based on analyzed data (e.g., data from previously received data, and the like), raw data, and/or received from one or more outside sources.

The machine learning engine 112d may receive data and, using one or more machine learning algorithms, may generate one or more machine learning datasets 112e. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention.

Dynamic takeover detection and control computing platform 110 may further have, store and/or include threat output module 112f. Threat output module 112f may store instructions and/or data that may cause or enable the dynamic takeover detection and control computing platform 110 to receive an output from the machine learning engine 112d and generate a notification including an identified threat. For instance, based on the machine learning datasets 112e, the threat output module may generate and transmit a notification indicating an identified threat or vulnerability, as well as one or more metrics associated with the identified threat of vulnerability. In some examples, the threat output module 112f may generate data quantifying an impact of the identified threat or vulnerability. The data may be displayed in a user interface that may be transmitted to a device and caused to display on a display of the device. In some examples, the threat output may include visualizations of data, such as trends, graphs, or the like, that may aid in identifying vulnerabilities at an enterprise-wide level.

Dynamic takeover detection and control computing platform 110 may further have, store and/or include mitigation action module 112g. Mitigation action module 112g may store instructions and/or data that may cause or enable the dynamic takeover detection and control computing platform 110 to identify and/or execute one or more mitigation actions based on the threat output generated by the threat output module 112f and/or an output from the machine learning engine 112d. For instance, based on an identified threat or vulnerability, mitigation action module 112g may identify one or more mitigation actions to implement, generate a command, instruction or signal to execute the one or more mitigation actions, transmit the command, instruction or signal to a computing device and execute or cause to execute the command, instruction or signal on the computing device.

In some examples, because the data analyzed by the dynamic takeover detection and control computing platform 110 may be aggregated data from a plurality of enterprise units within the enterprise, the identified threat, vulnerability, mitigation actions, and the like, may, in some examples, include enterprise wide threats, vulnerabilities and/or mitigation actions. Additionally or alternatively, the threat, vulnerability and/or mitigation action may be identified and/or executed for one enterprise unit or a plurality of enterprise units (e.g., more than one but not implemented at an enterprise-wide level).

FIGS. 2A-2E depict one example illustrative event sequence for implementing dynamic takeover detection and control functions in accordance with one or more aspects described herein. The events shown in the illustrative event sequence are merely one example sequence and additional events may be added, or events may be omitted, without departing from the invention.

With reference to FIG. 2A, at step 201, first login data may be received and processed by, for example, internal computing system 1 120. For instance, login data may be received on a continuous basis or in one or more batch processes. In some examples, the login data may be received in real-time or near real time and mined at predetermined time intervals, such as every 5 minutes, 10 minutes, or the like. In some examples, the login data may be received from one or more applications or systems hosted by or executed on internal computing system 1 120. Additionally or alternatively, the login data may be received from one or more applications or systems hosted by or executing on another computing device or system associated with the enterprise.

Processing the login data may include mining the data for unauthorized activity or indicators of unauthorized activity. For instance, one or more systems, such as internal computing system 1 120, may monitor authentication portals for various systems, applications, and the like within the enterprise. In many instances of an attempted account takeover, an unauthorized actor may have obtained (e.g., without authorization) credentials associated with a user. In order to determine whether the credentials are valid, whether they are associated with an account at this enterprise (e.g., vs. an account held at another enterprise), and the like, the unauthorized actor may test the credentials by attempting a login. This test login attempt may be captured by the systems monitoring the authentication portals and flagged. In some examples, the device from which the credentials were received may be identified and flagged as potential unauthorized for future use, the account may be locked, requests for additional authentication information may be transmitted, and the like. Additionally or alternatively, unauthorized actors may conduct multiple login attempts with different usernames and/or password combinations. This may also cause the user, user device, or the like, to be flagged as potentially unauthorized and mitigating actions may be taken with respect to the user, account, or the like (e.g., request for additional authentication information, account lock, or the like).

In some examples, the unauthorized actors may use bots to execute the test login attempts. In some examples, the test credentials may have varying capitalization, spacing, or the like in the scripts being used to attempt the login. Accordingly, detections may be written around the scripts to flag known errors, a threshold number of attempts, repeated attempt of variations in username, increase in attempted logins with a username, successful username and password combinations, and the like. The system may then execute one or more mitigation actions (e.g., automatically based on criteria being met).

Accordingly, by identifying the unauthorized activity (e.g., account takeover attempt) at the initial test login attempt, the mitigating actions (e.g., requiring additional authentication information, locking out an account, or the like) may be implemented in a timely and efficient manner in order to prevent or lessen impact of the unauthorized activity.

In some examples, the data may also include successful login attempts.

At step 202, a similar process may occur at internal computing system 2 125. For instance, login data or credentials may be captured and analyzed to detect unauthorized activity in a process similar to the process described above for internal computing system 1 120. Additionally or alternatively, unauthorized activity data, such as account takeover data, may be analyzed using one or more other processes or functions and data may be captured for further analysis. In some examples, internal computing system 1 120 may receive and process data for a first enterprise unit within the enterprise, while internal computing system 2 125 may receive and process data for a second enterprise unit within the enterprise and different from the first enterprise unit.

At step 203, first unauthorized event data may be generated by the internal computing system 1 120. For instance, based on the processed login data, first unauthorized event data may be generated. The first unauthorized event data may include the login attempts, successful logins, mitigating actions taken, and the like.

At step 204, second unauthorized event data may be generated by the internal computing system 2 125. For instance, based on the login data processed by the internal computing system 2 125, second unauthorized event data may be generated. The second unauthorized event data may include login attempts, successful logins, mitigating actions taken, and the like.

At step 205, a connection may be established between the internal computing system 2 125 and the dynamic takeover detection and control computing platform 110. For instance, a first wireless connection may be established between the dynamic takeover detection and control computing platform 110 and internal computing system 2 125. Upon establishing the first wireless connection, a communication session may be initiated between dynamic takeover detection and control computing platform 110 and internal computing system 2 125.

At step 206, the second unauthorized event data may be transmitted from internal computing system 2 125 to the dynamic takeover detection and control computing platform 110. For instance, the second unauthorized event data may be transmitted during the communication session initiated upon establishing the first wireless connection.

Figure 2B:
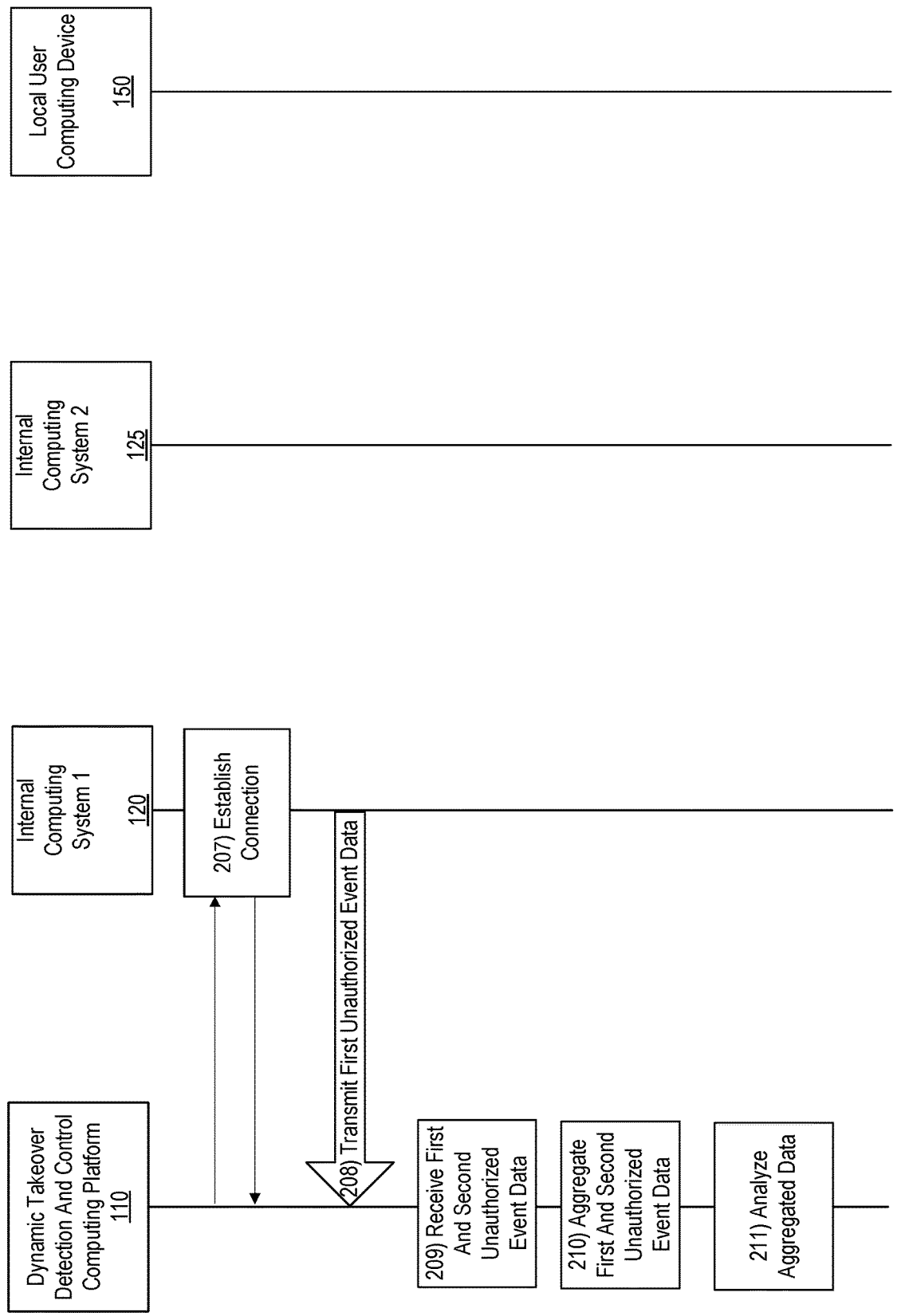

With reference to FIG. 2B, at step 207, a connection may be established between the internal computing system 1 120 and the dynamic takeover detection and control computing platform 110. For instance, a second wireless connection may be established between the dynamic takeover detection and control computing platform 110 and internal computing system 1 120. Upon establishing the second wireless connection, a communication session may be initiated between dynamic takeover detection and control computing platform 110 and internal computing system 1 120.

At step 208, the first unauthorized event data may be transmitted from internal computing system 1 120 to the dynamic takeover detection and control computing platform 110. For instance, the first unauthorized event data may be transmitted during the communication session initiated upon establishing the second wireless connection.

At step 209, the first unauthorized event data and the second unauthorized event data may be received by the dynamic takeover detection and control computing platform 110. At step 210, the first unauthorized event data and the second unauthorized event data may be aggregated for further processing. For instance, data from a plurality of enterprise units may be received and aggregated to enable analysis of the data on an enterprise-wide level.

At step 211, the aggregated data may be analyzed. In some examples, machine learning may be used to analyze the data, identify patterns or sequences in the data, and the like. For instance, one or more vulnerabilities may be identified by analyzing the aggregated data using machine learning to detect inconsistencies.

In some examples, analyzing the data may further include generating and analyzing one or more metrics associated with the data. This may enable comparisons between different enterprise units, quantifying a contribution of a particular enterprise unit, and the like.

For instance, one example metric may include a total amount of intelligence or data transmitted to the dynamic takeover detection and control computing platform 110 from a particular enterprise unit. This may include a sum of an amount of data received via different data streams, such as web watching, email, authentication portal monitoring, and the like.

Another example metric may include a percent of the enterprise unit's contribution for account takeover activity. For instance, the total number of account takeover alerts generated by a particular enterprise unit may be divided by the total number of takeover alerts to provide the percentage contribution of that particular enterprise unit.

In still another example, metrics may be focused on quantifying a financial impact of the data captured. For instance, one example metric may include a percentage of alerts from a particular enterprise unit that result in account takeover unauthorized activity (e.g., amount of data from a particular enterprise unit that was actionable). In some examples, this may be determined by dividing the number of alerts from a particular enterprise unit that resulted in unauthorized activity (e.g., loss of funds for the authorized user, or the like) by the number of alerts identified by the enterprise unit.

Yet another example metric may include the percentage of alerts from a particular enterprise unit that prevented unauthorized activity. This may be determined by dividing a number of alerts from the particular business unit that did not result in unauthorized activity (e.g., no loss of funds to the authorized user, or the like) by the number of alerts identified by the enterprise unit.

Still another example metric may include an amount of money associated with account takeover unauthorized activity linked to alerts from the particular enterprise unit (e.g., money saved or lost based on the data for a particular enterprise unit). This may be determined by multiplying the number of alerts from the enterprise unit resulting in actual account takeover unauthorized activity by the average number of dollars associated with account takeover unauthorized activity per activity.

These metrics may be calculated for different enterprise units to evaluate enterprise units that may be having a greater impact than others, that may need to revisit data processing functions, or the like. As discussed above, the metrics enable comparisons between enterprise units while also enabling an enterprise-wide view of the data.

Figure 2C:
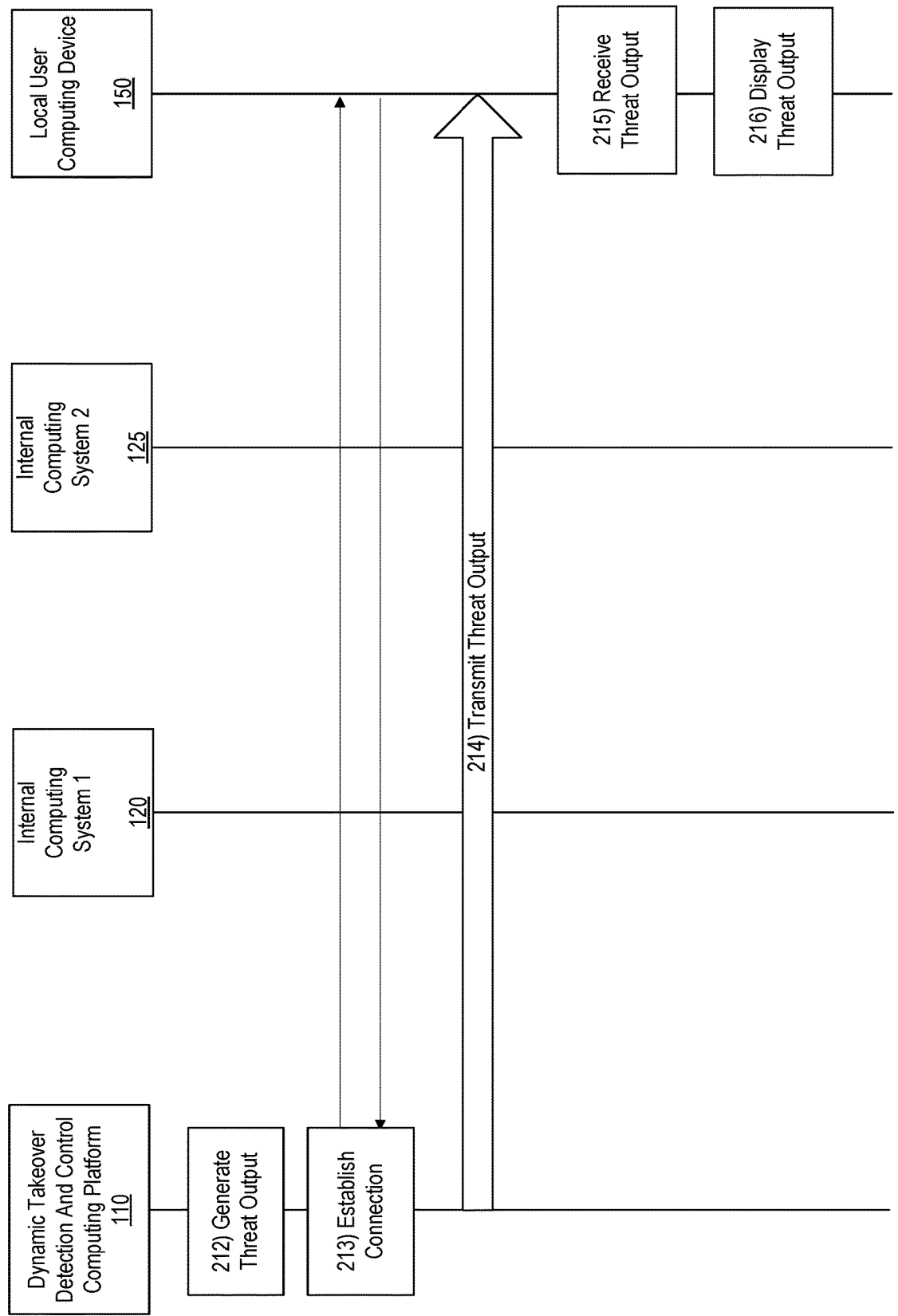

With reference to FIG. 2C, at step 212, a threat output may be generated. In some examples, the threat output may include a notification, user interface, or the like, including identification of a potential threat or vulnerability, output from data analysis performed at step 211, and the like. Because the data may be viewed at an enterprise-wide level, vulnerabilities in particular systems, applications, or the like, may be identified based on patterns in the data analyzed. For example, a particular authentication portal may be identified as highly vulnerable based on data received from a plurality of enterprise units. If the data is analyzed for a particular enterprise unit in a vacuum, the issue might not seem like a threat. However, when the data is aggregated from many enterprise units, what appeared to be a minor concern for one enterprise unit can be identified as a vulnerability for the entire enterprise and appropriate action may be taken.

Further, trends in data within a particular enterprise unit or between enterprise units may be identified and monitored. For instance, trends detected in multiple enterprise units may be flagged for further processing and a notification may be transmitted.

At step 213, a connection may be established between the dynamic takeover detection and control computing platform 110 and local user computing device 150. For instance, a third wireless connection may be established between the dynamic takeover detection and control computing platform 110 and local user computing device 150. Upon establishing the third wireless connection, a communication session may be initiated between dynamic takeover detection and control computing platform 110 and local user computing device 150.

At step 214, the generated threat output may be transmitted from the dynamic takeover detection and control computing platform 110 to the local user computing device 150. At step 215, the threat output may be received by the local user computing device 150 and, at step 216, the generated threat output may be displayed by a display of the local user computing device 150.

Figure 2D:
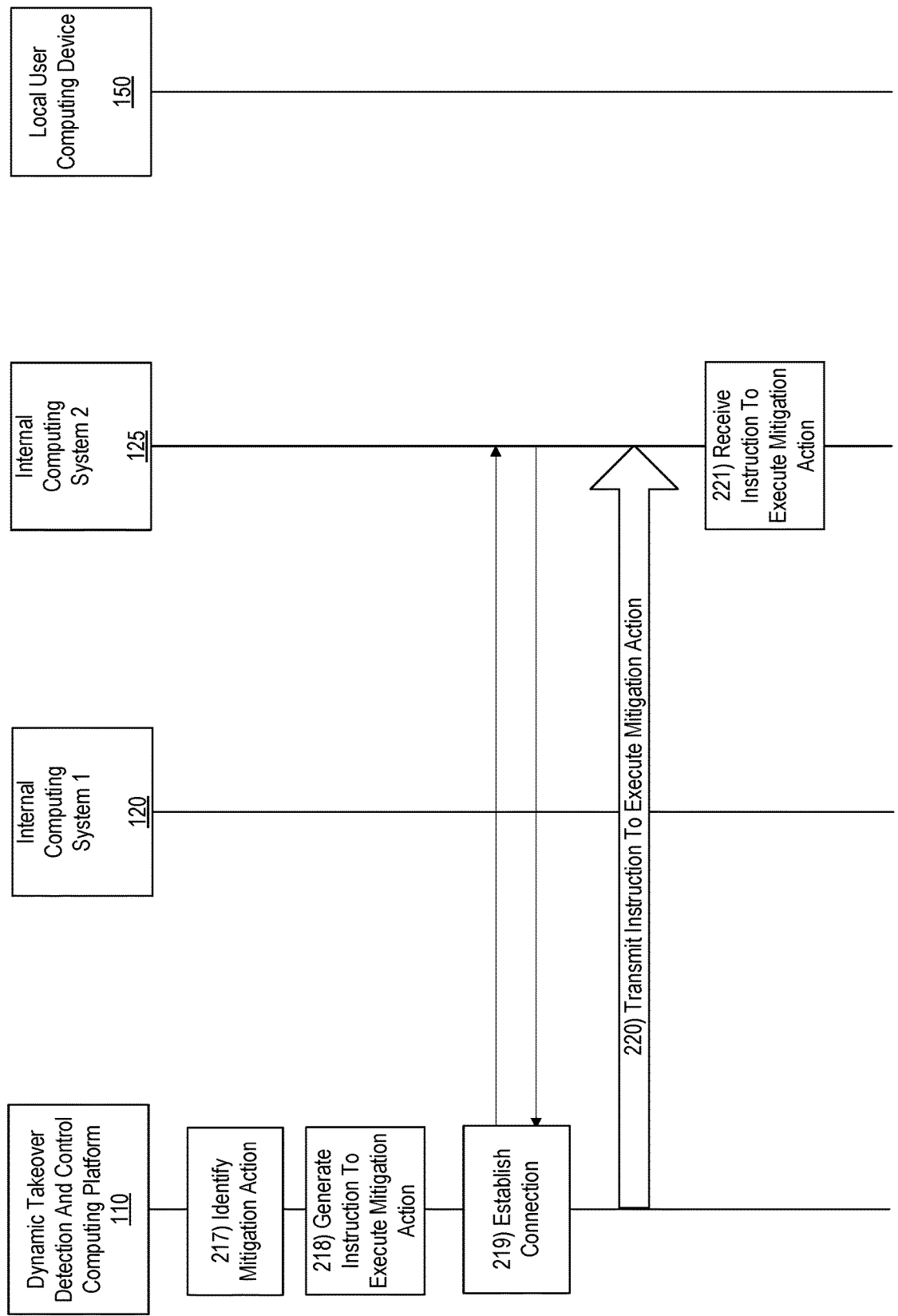

With reference to FIG. 2D, at step 217, one or more mitigation actions may be identified. In some examples, machine learning may be used to identify the one or more mitigation actions (e.g., based on patterns or sequences in the data). In some examples, mitigation actions may include starting or stopping one or more system functions (e.g., modifying functionality of one or more systems to mitigate impact of a threat or vulnerability), locking out accounts, automatically implementing additional authentication procedures (e.g., modifying authentication requirements to include multi-factor authentication, requests for secondary authentication data, and the like), and the like. For instance, if an online banking application appears, based on the data analysis, to have a vulnerability, the online banking application may be suspended (e.g., the application may be inaccessible to users) while additional security measures are implemented.

In another example, a mitigation action may include requiring additional authentication information at login. For instance, if the data shows a system-wide issue with a mobile banking application, the system may automatically modify authentication procedures such that additional authentication information (e.g., response to challenge questions, biometric data, multi-factor authentication, or the like) may be requested from a user at login and required in order to authenticate the user and access the system.

At step 218, an instruction or command to execute a mitigation action may be generated. For instance, based on the identified mitigation action, an instruction or command for a system or device to execute the mitigation action may be generated.

At step 219, a connection may be established between the dynamic takeover detection and control computing platform 110 and internal computing system 2 125. For instance, a fourth wireless connection may be established between the dynamic takeover detection and control computing platform 110 and internal computing system 2 125. Upon establishing the fourth wireless connection, a communication session may be initiated between dynamic takeover detection and control computing platform 110 and internal computing system 2 125.

At step 220, the generated instruction or command to execute the mitigation action may be transmitted from the dynamic takeover detection and control computing platform 110 to the internal computing system 2 125. The generated instruction or command may be transmitted during the communication session initiated upon establishing the fourth wireless connection.

At step 221, the instruction or command to execute the mitigation action may be received by internal computing system 2 125.

Figure 2E:
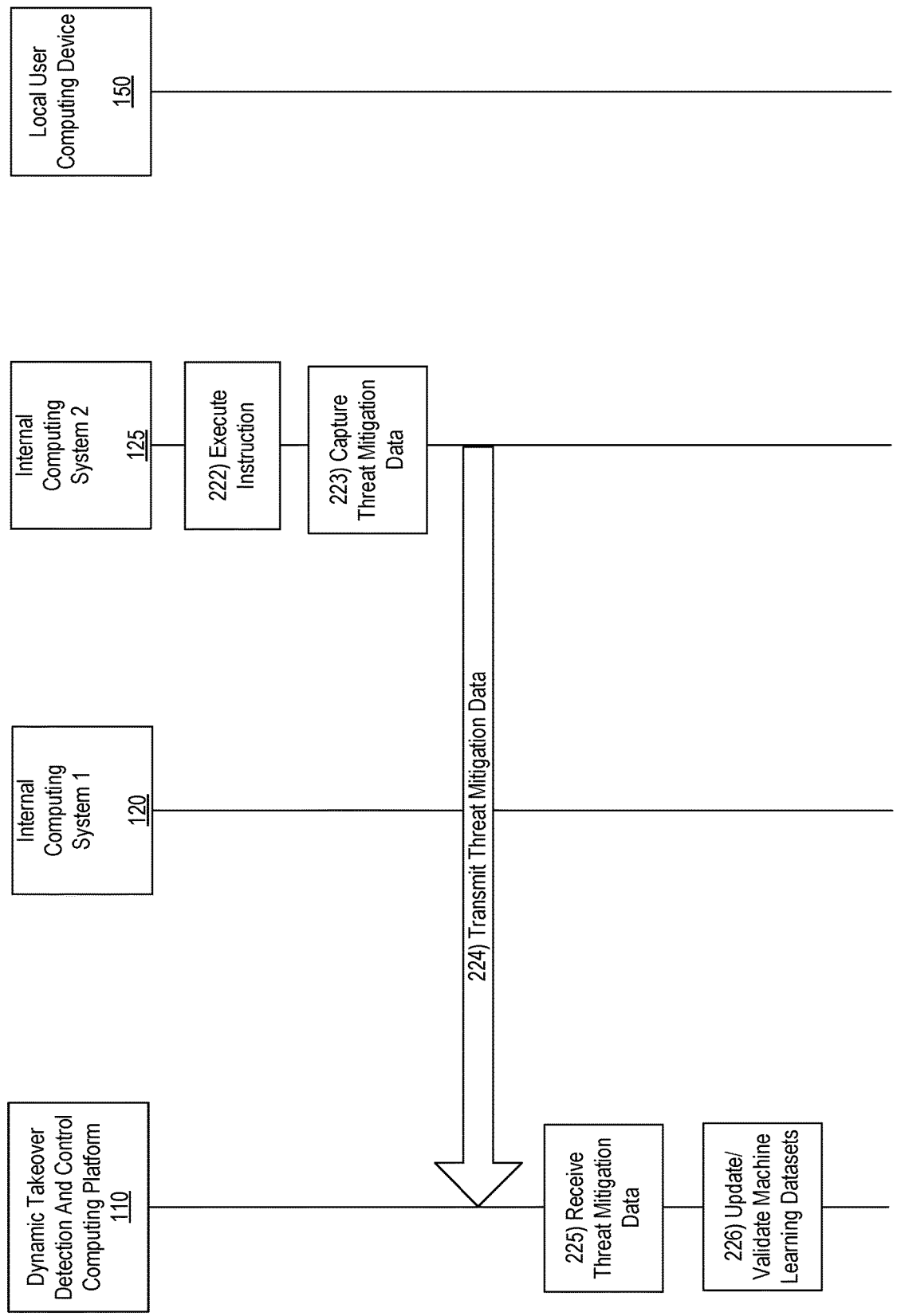

With reference to FIG. 2E, at step 222, the instruction or command may be executed by the internal computing system 2 125. Accordingly, the mitigation may be automatically generated and executed to enable efficient response to potential threats or vulnerabilities.

At step 223, threat mitigation data may be captured. For instance, data related to execution of the instruction associated with the mitigation action, an outcome of execution of the instruction, impact of the threat, and the like, may be captured by internal computing system 2 125.

At step 224, the threat mitigation data may be transmitted from internal computing system 2 125 to the dynamic takeover detection and control computing platform 110. In some examples, the threat mitigation data may be transmitted during the communication session initiated upon establishing the fourth wireless connection. In other examples, an additional wireless connection may be established and communication session initiated.

At step 225, the threat mitigation data may be received by dynamic takeover detection and control computing platform 110. At step 226, the received mitigation data may be used to update and/or validate one or more machine learning datasets used to detect threats or vulnerabilities, identify mitigation actions, and the like.

Figure 3:
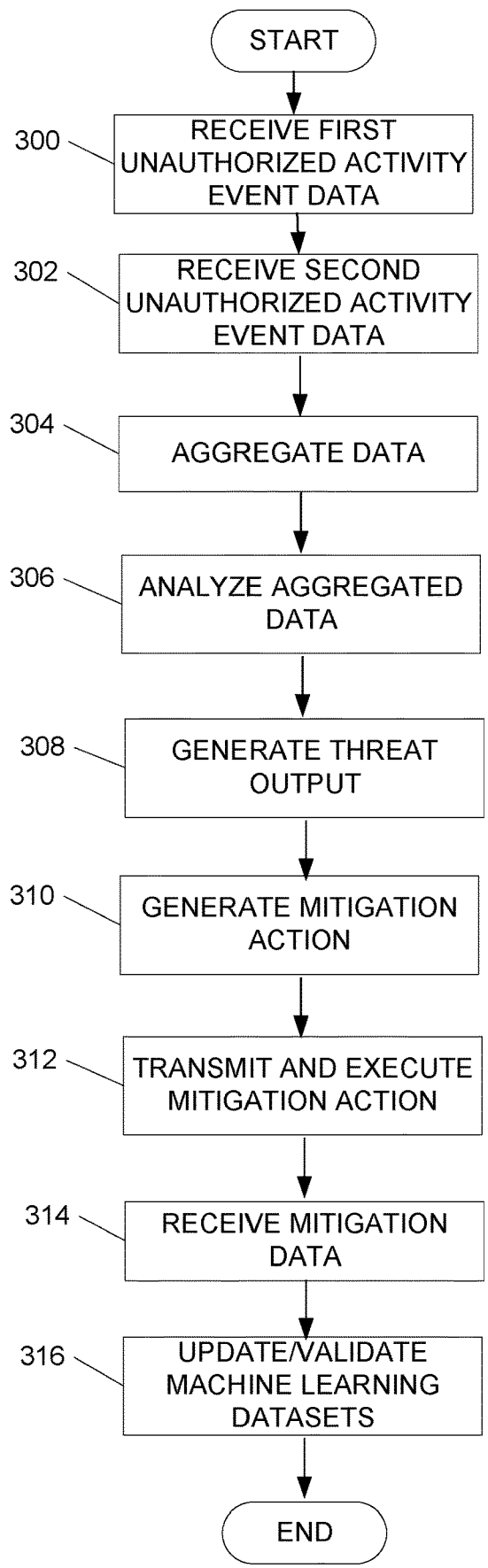
FIG. 3 depicts an illustrative method for implementing and using dynamic takeover detection and control functions according to one or more aspects described herein.

FIG. 3 is a flow chart illustrating one example method of implementing dynamic unauthorized activity event detection and control functions, such as account takeover attempt detection and control functions, according to one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described.

At step 300, first unauthorized activity event data may be received. For instance, first data associated with a plurality of account takeovers, account takeover attempts, and the like, may be received. In some examples, the first unauthorized activity event data may be received from a computing device or system associated with a first enterprise unit within an entity implementing the dynamic takeover detection and control computing platform 110.

At step 302, second unauthorized activity event data may be received. For instance, second data associated with a plurality of account takeovers, account takeover attempts, and the like, may be received. In some examples, the second unauthorized activity event data may be received from a computing device or system associated with a second enterprise unit within the entity implementing the dynamic takeover detection and control computing platform 110, different from the first enterprise unit.

At step 304, the received first unauthorized activity event data and second unauthorized activity event data may be aggregated. In some examples, aggregating the data may include formatting one or more datasets to a common format, a format to enable further processing, or the like. Although two unauthorized activity event datasets are described (and received from two enterprise units) additional datasets may be received from other enterprise units without departing from the invention.

At step 306, the aggregated data may be analyzed. In some examples, machine learning may be used to analyze the data, detect vulnerabilities, and the like. Additionally or alternatively, the data may be analyzed to generate the metrics described herein that may be used to evaluate the data at an enterprise-wide level.

At step 308, a threat output may be generated. For instance, the threat output may include identification of any vulnerabilities, correlations or trends detected, and the like. The threat output may be transmitted to one or more computing devices.

At step 310, one or more mitigation actions may be identified and instructions or commands executing the mitigation actions may be generated. For instance, machine learning may be used to identify one or more mitigation actions based on the threat output. An instruction or command to execute the mitigation action may be generated. In some examples, the mitigation action may include shutting down a system or application, preventing access to a system or application, locking or preventing access to one or more accounts, or the like.

At step 312, the generated mitigation action may be transmitted to a computing device or system and executed. For instance, the generated mitigation action may be automatically executed by the system in order to efficiently take steps to mitigate potential impact of a threat.

At step 314, mitigation data captured by a computing device or system may be received. The mitigation data may include identification of the mitigation action implemented, any outcomes associated with the mitigation action, and the like.

At step 316, the mitigation data may be used to update and/or validate one or more machine learning datasets. For instance, outcomes of implemented mitigation actions may be used to update and/or validate one or more machine learning datasets in order to continuously improve prediction of threats, identification of mitigation actions, and the like.

Figure 4:
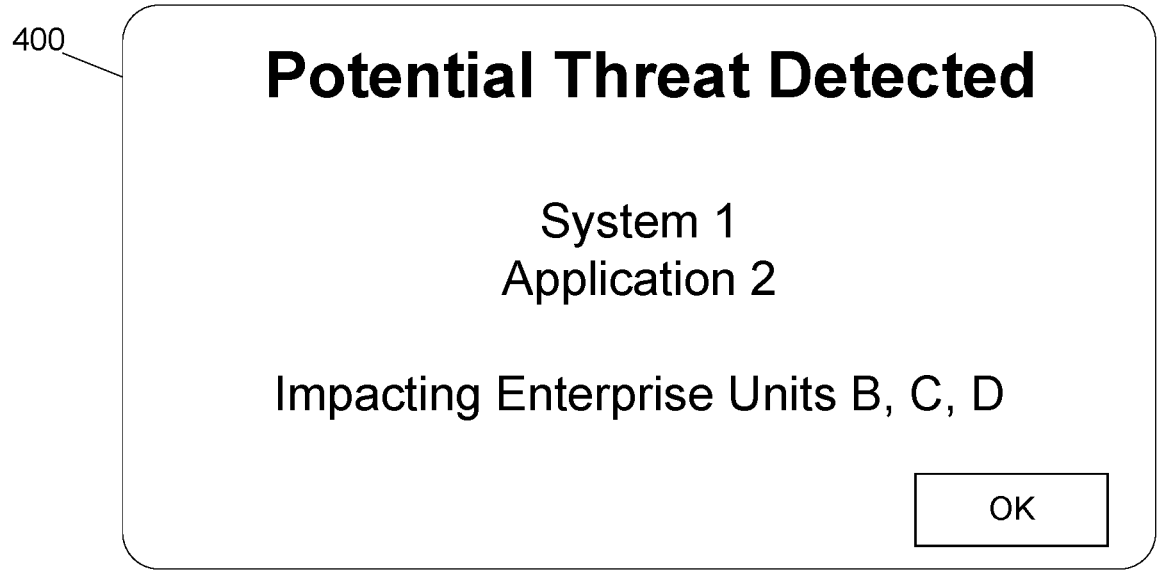
FIG. 4 illustrates one example user interface that may be generated according to one or more aspects described herein.

FIG. 4 illustrates one example notification that may be generated in accordance with one or more aspects described herein. The notification generally includes a user interface 400 indicating that a potential threat has been detected or predicted. The interface 400 may further include identification of the system(s), application(s) or the like, impacted or potentially impacted by the threat. The interface 400 may further include identification of one or more enterprise units that may be impacted by the threat or potential threat. In some examples, the notification may include an indication of one or more mitigation actions that may be automatically executed in order to control impact of the threat or potential threat. The user interface 400 is merely one example notification that may be generated. Other example notifications may include display of metrics associated with an enterprise unit, visualizations such as charts or graphs depicting trends identified in the data, and the like, without departing from the invention.

As discussed herein, aspects described relate to analyzing unauthorized activity event data, such as account takeover data, to identify enterprise-wide vulnerabilities, vulnerabilities between enterprise units, and the like. By aggregating data to assess threat at an enterprise level, the system may efficiently identify potential issues and quickly and efficiently transmit the data to one or more enterprise units that may be impacted. This may lead to earlier execution of mitigation actions which may aid in preventing or reducing loss associated with a vulnerability, impact of unauthorized activity, and the like.

As discussed herein, unauthorized activity event data, such as account takeover data, may be received in real-time or near real-time to enable efficient processing of the data. In some examples, the logs being received may be mined for data at predetermined time intervals (e.g., every 5 minutes, every 10 minutes, or the like). The predetermined time interval may be adjusted or customized to ensure all logs are received and ready for mining. The logs may be mined to detect unauthorized use of a valid username and password pair. Processed data may be written to a database table and that data may be captured for further analysis on a predetermined basis (e.g., every 5 minutes, every 10 minutes or the like). The further analysis may include evaluation of data entries to ensure that all unauthorized activity is identified and mitigation actions are implemented (e.g., account lockout, mandatory password reset, or the like).

In some examples, historical data is used to write detections to identify account takeover activity. For instance, data may be analyzed to identify, for example, new browser sessions (e.g. having no cookies), static cookies, login from a new geographical region, login from an unknown or unidentified device, or the like. The login data may be compared to previous logins for a user to determine when a login appears abnormal. Accordingly, even if a user is attempting to login from a new geographic region, the login may be received from a known or previously identified device and, as such might not be identified as potentially unauthorized. Accordingly, the system may evaluate various criteria in order to detect unauthorized activity. However, the examples discussed above are merely some examples of how account takeover is detected and various other criteria may be used without departing from the invention.

In examples in which a new process is being used to attempt an account takeover, new or additional scripts may be written to detect the new process and the system may review historical data to identify any occurrences of compromised accounts.

The account takeover data may be processed and received by the dynamic takeover detection and control computing platform 110 for aggregation and further analysis. As discussed herein, accurately capturing account takeover data quickly and efficiently then enables further analysis of data at an enterprise level. The aggregated data can be evaluated to detect trends, peaks, particular vulnerabilities, and the like. This enables more strategic response and execution of mitigation actions at an enterprise level. For instance, the at-risk value or actual losses associated with data for individual enterprise units and/or throughout an enterprise may be identified and used to implement strategic decisions to mitigate impact of threats.

The arrangements described herein enable scalability of data from multiple sources (e.g., a plurality of enterprise units) to provide a holistic view of the enterprise organization.

Although various aspects discussed herein are related to account takeover attempts or occurrences, various other unauthorized activity may be detected, such as accounts having new connections to payment transfer systems, activity received via a phishing website, or the like.

The aggregated data may be analyzed to detect potential issues with any digital areas offered by the enterprise organization. For instance, the aggregated data may enable strategic implementation and execution of mitigating actions in particular areas (e.g., modifying controls or authentication requirements). For instance, one or more thresholds may be established such that if at least a threshold amount of account takeover activity is detected for a particular application, system or portal, the system may automatically initiate mitigating actions such as modifying functionality of a system, modifying authentication requirements, and the like.

In addition to providing strategic decisioning for mitigation actions at an enterprise level, the aggregate data may be used to evaluate data from each enterprise unit as compared to other enterprise units. For instance, accuracy and effectiveness of data, timeliness of actions implemented, types of mitigation actions executed, and the like, may be compared to aid in improving performance and efficiencies of unauthorized activity event data analysis in various enterprise units.

Figure 5:
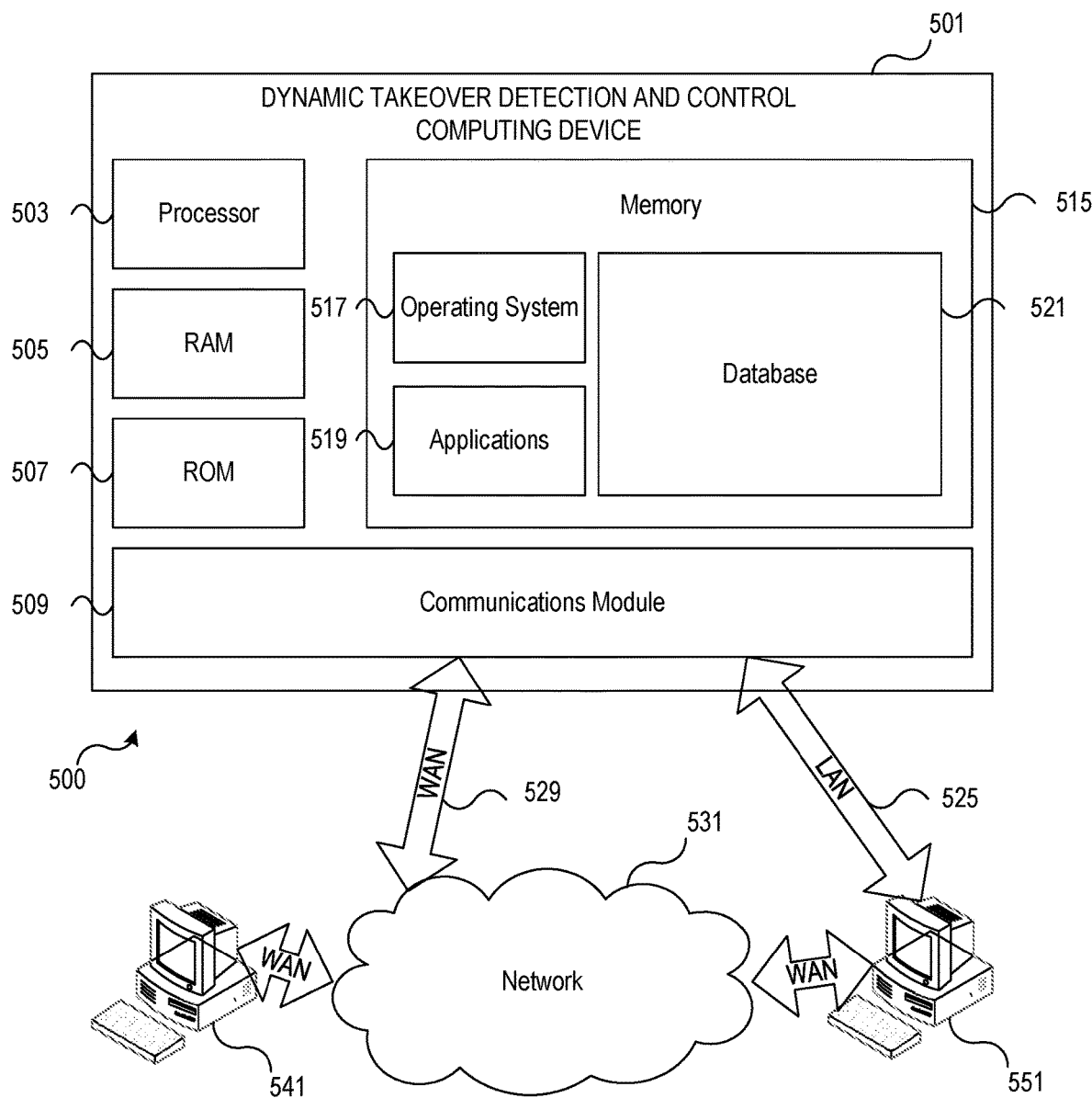
FIG. 5 illustrates one example environment in which various aspects of the disclosure may be implemented in accordance with one or more aspects described herein.

FIG. 5 depicts an illustrative operating environment in which various aspects of the present disclosure may be implemented in accordance with one or more example embodiments. Referring to FIG. 5, computing system environment 500 may be used according to one or more illustrative embodiments. Computing system environment 500 is only one example of a suitable computing environment and is not intended to suggest any limitation as to the scope of use or functionality contained in the disclosure. Computing system environment 500 should not be interpreted as having any dependency or requirement relating to any one or combination of components shown in illustrative computing system environment 500.

Computing system environment 500 may include dynamic takeover detection and control computing device 501 having processor 503 for controlling overall operation of dynamic takeover detection and control computing device 501 and its associated components, including Random Access Memory (RAM) 505, Read-Only Memory (ROM) 507, communications module 509, and memory 515. Dynamic takeover detection and control computing device 501 may include a variety of computer readable media. Computer readable media may be any available media that may be accessed by dynamic takeover detection and control computing device 501, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by dynamic takeover detection and control computing device 501.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on dynamic takeover detection and control computing device 501. Such a processor may execute computer-executable instructions stored on a computer-readable medium.

Software may be stored within memory 515 and/or storage to provide instructions to processor 503 for enabling dynamic takeover detection and control computing device 501 to perform various functions as discussed herein. For example, memory 515 may store software used by dynamic takeover detection and control computing device 501, such as operating system 517, application programs 519, and associated database 521. Also, some or all of the computer executable instructions for dynamic takeover detection and control computing device 501 may be embodied in hardware or firmware. Although not shown, RAM 505 may include one or more applications representing the application data stored in RAM 505 while dynamic takeover detection and control computing device 501 is on and corresponding software applications (e.g., software tasks) are running on dynamic takeover detection and control computing device 501.

Communications module 509 may include a microphone, keypad, touch screen, and/or stylus through which a user of dynamic takeover detection and control computing device 501 may provide input, and may also include one or more of a speaker for providing audio output and a video display device for providing textual, audiovisual and/or graphical output. Computing system environment 500 may also include optical scanners (not shown).

Dynamic takeover detection and control computing device 501 may operate in a networked environment supporting connections to one or more remote computing devices, such as computing devices 541 and 551. Computing devices 541 and 551 may be personal computing devices or servers that include any or all of the elements described above relative to dynamic takeover detection and control computing device 501.

The network connections depicted in FIG. 5 may include Local Area Network (LAN) 525 and Wide Area Network (WAN) 529, as well as other networks. When used in a LAN networking environment, dynamic takeover detection and control computing device 501 may be connected to LAN 525 through a network interface or adapter in communications module 509. When used in a WAN networking environment, dynamic takeover detection and control computing device 501 may include a modem in communications module 509 or other means for establishing communications over WAN 529, such as network 531 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

Figure 6:
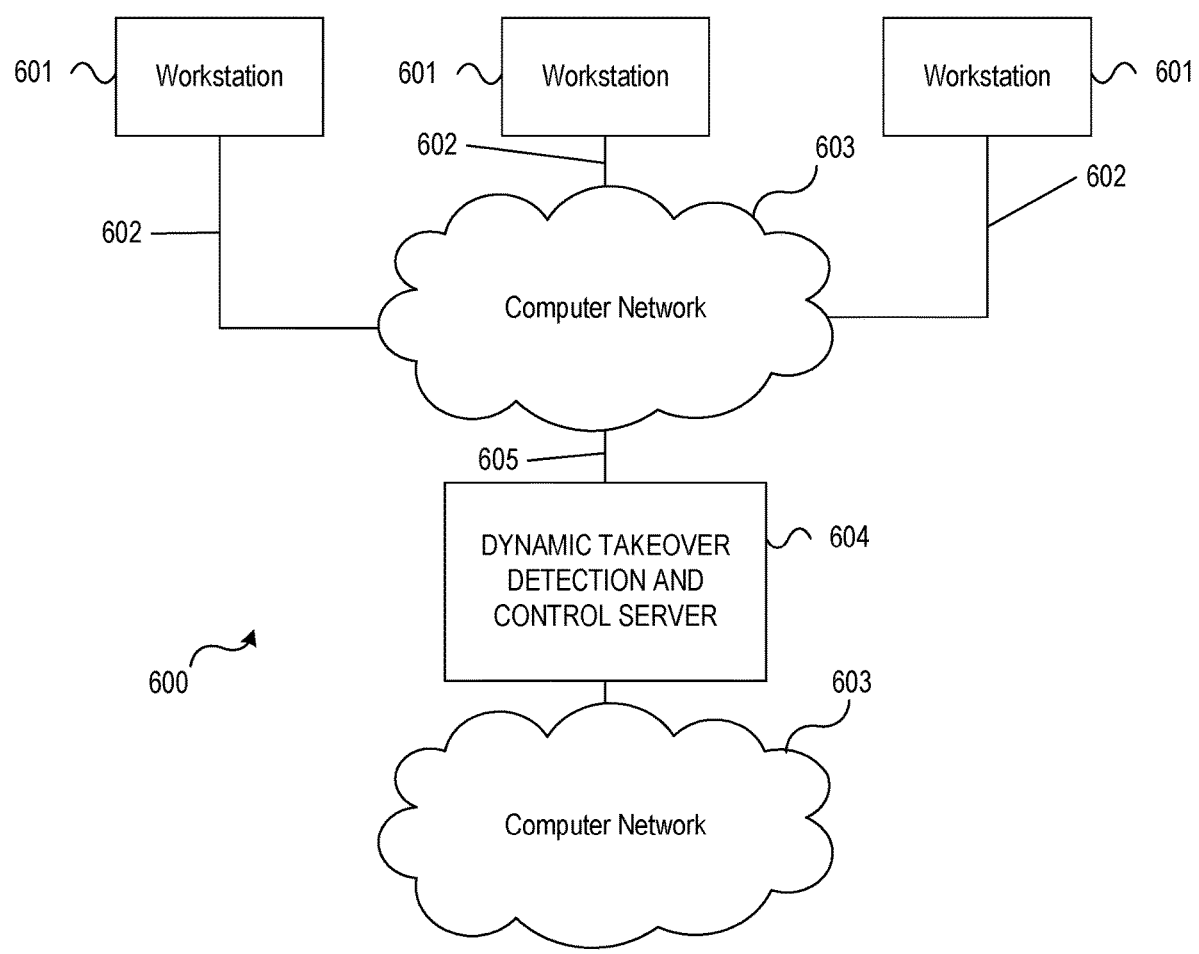
FIG. 6 depicts an illustrative block diagram of workstations and servers that may be used to implement the processes and functions of certain aspects of the present disclosure in accordance with one or more aspects described herein.

FIG. 6 depicts an illustrative block diagram of workstations and servers that may be used to implement the processes and functions of certain aspects of the present disclosure in accordance with one or more example embodiments. Referring to FIG. 6, illustrative system 600 may be used for implementing example embodiments according to the present disclosure. As illustrated, system 600 may include one or more workstation computers 601. Workstation 601 may be, for example, a desktop computer, a smartphone, a wireless device, a tablet computer, a laptop computer, and the like, configured to perform various processes described herein. Workstations 601 may be local or remote, and may be connected by one of communications links 602 to computer network 603 that is linked via communications link 605 to dynamic takeover detection and control server 604. In system 600, dynamic takeover detection and control server 604 may be a server, processor, computer, or data processing device, or combination of the same, configured to perform the functions and/or processes described herein. Server 604 may be used to receive unauthorized activity event data, such as account takeover data, from one or more computing systems associated with one or more enterprise units, aggregate the data, analyze the data to identify potential threats, mitigation actions, and the like.

Computer network 603 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 602 and 605 may be communications links suitable for communicating between workstations 601 and dynamic takeover detection and control server 604, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
    at least one processor;
    a communication interface communicatively coupled to the at least one processor; and
    a memory storing computer-readable instructions that, when executed by the at least one processor, cause the computing platform to:
        receive, in real-time and from a first enterprise unit of an enterprise organization, first unauthorized activity event data, the first unauthorized activity event data including login data received by a computing system of the first enterprise unit and analyzed by the computing system of the first enterprise unit to identify unauthorized activity;
        receive, in real-time and from a second enterprise unit of the enterprise organization, second unauthorized activity event data, the second unauthorized activity event data including login data received by a computing system of the second enterprise unit and analyzed by the computing system of the second enterprise unit to identify unauthorized activity;
        aggregate the first unauthorized activity event data and the second unauthorized activity event data including formatting at least one of: the first unauthorized activity event data or the second unauthorized activity event data to generate aggregated data;
        analyze, using machine learning, the aggregated data, the analyzing the aggregated data including mining data logs at pre-determined intervals;
        generate, based on the analyzed aggregated data, a threat output, the threat output including a vulnerability in one of: the first enterprise unit or the second enterprise unit based on the analysis of the aggregated data;
        identify, based on the threat output and using machine learning, at least one mitigating action to execute; and
        execute the at least one mitigating action.

2. The computing platform of claim 1, wherein the at least one mitigating action includes modifying authentication requirements to access at least one system of the enterprise organization.

3. The computing platform of claim 1, wherein the at least one mitigating action includes modifying operation of at least one system of the enterprise organization.

4. The computing platform of claim 1, wherein the first unauthorized activity event data and the second unauthorized activity event data include data associated with account takeover attempts.

5. The computing platform of claim 1, wherein generating the threat output further includes generating a user interface including data identifying a potential threat.

6. The computing platform of claim 1, further including instructions that, when executed, cause the computing platform to:
    after executing the at least one mitigating action, receive mitigation data; and
    validate one or more machine learning datasets based on the received mitigation data.

7. The computing platform of claim 1, wherein analyzing, using machine learning, the aggregated data, further includes determining a total amount of data received from different types of data streams.

8. A method, comprising:
    receiving, by a computing platform having a memory and at least one processor, in real-time and from a first enterprise unit of an enterprise organization, first unauthorized activity event data, the first unauthorized activity event data including login data received by a computing system of the first enterprise unit and analyzed by the computing system of the first enterprise unit to identify unauthorized activity;
    receive, by the at least one processor in real-time and from a second enterprise unit of the enterprise organization, second unauthorized activity event data, the second unauthorized activity event data including login data received by a computing system of the second enterprise unit and analyzed by the computing system of the second enterprise unit to identify unauthorized activity;
    aggregating, by the at least one processor, the first unauthorized activity event data and the second unauthorized activity event data including formatting at least one of: the first unauthorized activity event data or the second unauthorized activity event data to generate aggregated data;
    analyzing, by the at least one processor and using machine learning, the aggregated data, the analyzing the aggregated data including mining data logs at pre-determined intervals;
    generating, by the at least one processor and based on the analyzed aggregated data, a threat output, the threat output including a vulnerability in one of: the first enterprise unit or the second enterprise unit based on the analysis of the aggregated data;
    identifying, by the at least one processor, based on the threat output and using machine learning, at least one mitigating action to execute; and
    executing, by the at least one processor, the at least one mitigating action.

9. The method of claim 8, wherein the at least one mitigating action includes modifying authentication requirements to access at least one system of the enterprise organization.

10. The method of claim 8, wherein the at least one mitigating action includes modifying operation of at least one system of the enterprise organization.

11. The method of claim 8, wherein the first unauthorized activity event data and the second unauthorized activity event data include data associated with account takeover attempts.

12. The method of claim 8, wherein generating the threat output further includes generating a user interface including data identifying a potential threat.

13. The method of claim 8, further including
after executing the at least one mitigating action, receiving, by the at least one processor, mitigation data; and
validating, by the at least one processor, one or more machine learning datasets based on the received mitigation data.

14. One or more non-transitory computer-readable media storing instructions that, when executed by a computing platform comprising at least one processor, memory, and a communication interface, cause the computing platform to:
receive, in real-time and from a first enterprise unit of an enterprise organization, first unauthorized activity event data, the first unauthorized activity event data including login data received by a computing system of the first enterprise unit and analyzed by the computing system of the first enterprise unit to identify unauthorized activity;
receive, in real-time and from a second enterprise unit of the enterprise organization, second unauthorized activity event data, the second unauthorized activity event data including login data received by a computing system of the second enterprise unit and analyzed by the computing system of the second enterprise unit to identify unauthorized activity;
aggregate the first unauthorized activity event data and the second unauthorized activity event data including formatting at least one of: the first unauthorized activity event data or the second unauthorized activity event data to generate aggregated data;
analyze, using machine learning, the aggregated data, the analyzing the aggregated data including mining data logs at pre-determined intervals;
generate, based on the analyzed aggregated data, a threat output, the threat output including a vulnerability in one of: the first enterprise unit or the second enterprise unit based on the analysis of the aggregated data;
identify, based on the threat output and using machine learning, at least one mitigating action to execute; and
execute the at least one mitigating action.

15. The one or more non-transitory computer-readable media of claim 14, wherein the at least one mitigating action includes modifying authentication requirements to access at least one system of the enterprise organization.

16. The one or more non-transitory computer-readable media of claim 14, wherein the at least one mitigating action includes modifying operation of at least one system of the enterprise organization.

17. The one or more non-transitory computer-readable media of claim 14, wherein the first unauthorized activity event data and the second unauthorized activity event data include data associated with account takeover attempts.

18. The one or more non-transitory computer-readable media of claim 14, wherein generating the threat output further includes generating a user interface including data identifying a potential threat.

19. The one or more non-transitory computer-readable media of claim 14, further including instructions that, when executed, cause the computing platform to:
after executing the at least one mitigating action, receive mitigation data; and
validate one or more machine learning datasets based on the received mitigation data.

\* \* \* \* \*